Nov. 27, 1934.  I. F. KINNARD  1,982,344
ELECTROMAGNETIC APPARATUS
Filed April 18, 1928
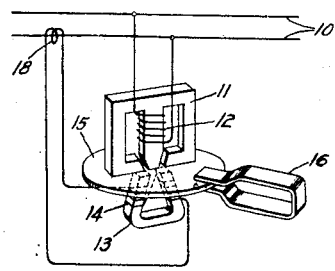
Fig.1.
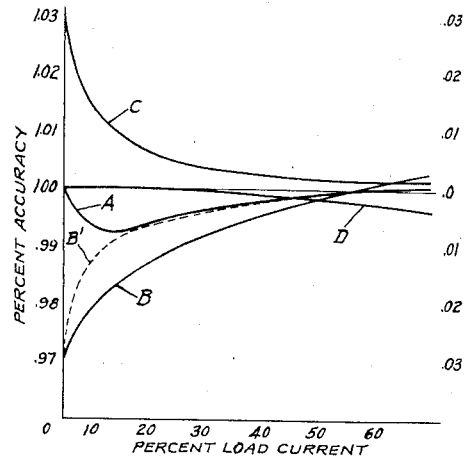
Fig.2.
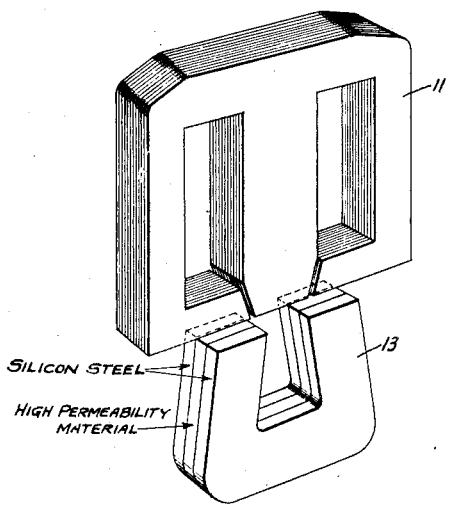
Fig.3.
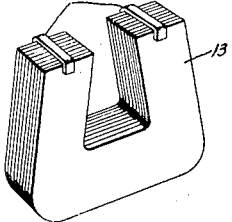
Fig.4.
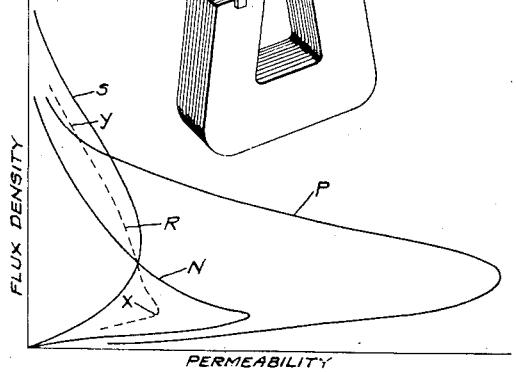
Fig.5.
Fig.6.
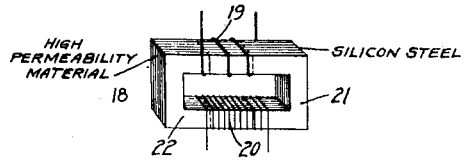
Inventor:
Isaac F. Kinnard,
by Charles E. Tullar
His Attorney.

Patented Nov. 27, 1934

1,982,344

UNITED STATES PATENT OFFICE 1,982,344

ELECTROMAGNETIC APPARATUS

Isaac F. Kinnard, Lynnfield, Mass., assignor to General Electric Company, a corporation of New York Application April 18, 1928, Serial No. 271,042

28 Claims. (Cl. 171—264)

My invention relates to improvements in the magnetic circuits of electrical apparatus, and is particularly important in electromagnetic apparatus which is required to function with a high degree of accuracy over a considerable range of flux variation such for example as electromagnetic measuring devices, relays and instrument transformers.

It is known that the permeability of the magnetic material commonly employed in the magnetic circuits of electrical apparatus varies considerably over the normal flux density operating range below saturation. For example, the permeability of ordinary silicon steel gradually increases as the flux density is raised and reaches a maximum of about 6000 to 8000 times that of air at a flux density in the neighborhood of 4 to 6 kilogausses per square centimeter and then decreases again and approaches that of air as the flux density is raised to the saturation value. The permeability of the cores of many electromagnetic devices varies several hundred per cent in normal operation and accounts for many of the characteristic errors of such devices.

The primary object of my invention is to modify the permeability of the cores of electrical apparatus generally to obtain a more desirable permeability characteristic in the flux density range over which such devices are called upon to operate to the end that the difficulties and errors which are caused by variation in permeability shall be reduced or eliminated. Preferably I accomplish this result by employing in the core member two or more magnetic materials having permeability characteristics which vary with respect to each other in such a way that when combined in the proper amounts the resultant permeability of the core as a whole more nearly approximates the permeability desired for that particular apparatus over its normal flux density operating range. The materials of different permeability characteristics which are employed in making up the magnetic circuit may be arranged in parallel or in series relation in the magnetic circuit.

In the description which follows I will describe by way of example how the invention may be employed to improve the accuracy of operation of watthour meters and of current transformers. In the drawing Fig. 1 represents the induction type wattmeter to which my invention has been applied; Fig. 2 represents by way of curves an analysis of the light load portion of the load accuracy curve of an integrating induction wattmeter which will be referred to in explaining how, by means of my invention, the light load error of this type of meter has been corrected; Fig. 3 represents a preferred embodiment of the invention as applied to a watthour meter in which approximately one-third of the current core is made of a material having a higher permeability than silicon steel at low flux densities. This material is arranged in parallel relation with silicon steel in the magnetic circuit in this modification; Fig. 4 represents another application of the invention to a watthour meter for the same purpose in which materials having different permeabilities are arranged in series relation in the magnetic circuit of the current core; Fig. 5 represents characteristic permeability flux density curves of a few of the magnetic materials which I have found useful in carrying out the invention. And Fig. 6 represents a current transformer showing how the invention may be applied with beneficial results.

The features of the invention which are believed to be novel and patentable will be pointed out in the claims appended hereto and the application of the invention for correcting for the light load droop of watthour meters will be specifically claimed in this application.

Referring to Fig. 1, I have here represented the essential elements of an ordinary induction type watthour meter together with its connections to a circuit 10 to be metered. The current coil is shown connected to the line through a current transformer 18. The essential parts of the meter comprise a potential core 11, a potential coil 12, a current core 13, with its current coil 14, a rotatably mounted conducting disc 15 with which the current and potential fluxes cooperate to produce a torque proportional to the in-phase components of the two fluxes and a damping magnet 16 to make the disc speed proportional to torque.

In Fig. 2 at A I have represented the light load portion of the usual load accuracy curve of such a meter obtained by operating the meter at rated voltage and frequency and varying the current in which curve the characteristic light load droop is represented.

I have found by investigation that if the ratio of effective torque to meter current in a watthour meter can be sufficiently increased over a load range where the light load droop usually exists, this error may be eliminated. In my copending application, Serial No. 173,248, filed March 7, 1927, this is accomplished by taking advantage of the variation in permeability of ordinary silicon steel at different flux densities. In the present invention I make the magnetic circuit of the meter, or a portion thereof, of materials having different permeabilities at a given flux density and arrange matters so as to increase the permeability of the current core and consequently the ratio of driving flux to meter current over that range of load where the light load droop usually occurs to the extent necessary to eliminate such light load droop.

It has been the standard practice to adjust the light load torque of induction watthour meters so that the meter is accurate at 5% or 10% and 100% loads. This seems to give the best overall accuracy. Below 5% load current the curve has not been plotted in Fig. 2 since it does not enter into the present problem. The light load droop is present and is a maximum at about 15% load. The overload droop is not shown and does not enter into the present problem except that, in practicing the invention, precautions are taken so as not to operate the current core, considered as a whole too close to saturation since if this is done the overload droop of the usual meter would be increased. The other curves shown in Fig. 2 show why the light load droop exists and how it is corrected by the present invention.

Curve B is plotted from the ratio of current flux to current on the basis that at 100% load this ratio equals 100%. For curves A and B the ordinates at the left are used. Curve C is plotted from the ratio of corrective light load adjustment torque to current plotted in per cent from the 100% accuracy line, the ordinates at the right being used. The light load adjustment torque is constant so that this curve approaches the 100% accuracy line in the form of a true hyperbola, it being merely a constant divided by the per cent load. Curve D is plotted from the ratio of current flux damping torque to current. The current flux damping torque varies approximately as the cube of the current, and therefore the above ratio, as the square. It is quite negligible at light loads but has been shown here in order to make the analysis complete. This curve is plotted in per cent from the 100% accuracy line, the ordinates at the right being used. From these curves it may be seen why the light load droop exists. It is because the curve B does not have the same shape as the curve C. Curve C approaches the 100% accuracy curve much faster than curve B where the light load error originates. It is evident that since the light load adjustment torque is constant the shape of curve C cannot be changed. However, if it were possible to change the shape of the current flux curve B to that indicated by the dotted line curve B', it is evident that the light load droop would be eliminated or very materially reduced. The purpose of the present invention is to change the shape of the curve B so that it will conform as near as possible to a true hyperbola corresponding to the theoretically correct curve B'.

I accomplish this result preferably by employing a current core such as is shown in Fig. 3 where the core is made up partially of ordinary silicon steel such as is usually employed and partially of a material having a very much higher permeability than silicon steel at the flux density where the light load droop of the meter would ordinarily exist. It will be appreciated that if a high permeability alloy were used in the entire magnetic circuit of the meter without any silicon steel, the falling off in permeability at low inductions would be so slight that the light load droop would be practically eliminated. The difficulty, however, of using high permeability alloys for the entire magnetic circuit is that they tend to saturate too quickly and un- favorably affect the overload droop. Thus where the meter is to be subjected to overloads I prefer to employ part silicon steel and part high permeability material in the current core as hereinafter described. In Fig. 3 about two-thirds of the laminations are made of ordinary silicon steel and about one-third of a high permeability material. The relative amounts of the two materials will depend upon their relative permeability characteristics and the invention is not confined to any particular number or kinds of materials or any particular ratio between the amount of the materials which are combined.

I also prefer to place the high permeability material in the center as represented, but this is not essential nor is it essential that the two different materials be placed in parallel relation in the magnetic circuit. Each of the three sections of the current core represented in Fig. 3 will preferably be made up of thin laminations in the usual way but since this would make the drawing confusing this has not been shown.

A high permeability material which I have found to be satisfactory for the application and relative proportions represented in Fig. 3 is an alloy comprising substantially 76% nickel, 14% iron and 8% copper, together with a small amount of impurities which are apparently neither beneficial nor detrimental. The relation of the permeability of this material to that of silicon steel is represented in Fig. 5 where S represents the flux density-permeability curve of ordinary silicon steel and N the corresponding curve for the alloy specified above. It is seen that the permeability of the alloy is very much higher than that of the steel at the lower flux densities but is lower than that for the steel at higher flux densities. If we should use half steel and half alloy in the core it is evident that we would obtain a resultant permeability corresponding to the average curve R. When about one-third of the current core is made of this particular alloy as represented in Fig. 3 and the remainder of silicon steel, the resultant permeability of the current core is modified so as to raise the curve B of Fig. 2 to the dotted line curve B'. The light load accuracy curve A then becomes substantially flat; that is, the droop is substantially eliminated and the load accuracy curve conforms to substantially 100% over this load range.

Another modification of the invention which I have found produces beneficial results and which substantially eliminates the light load droop is shown in Fig. 4. In this case the main body of the current core 13 is made of ordinary silicon steel and the pole faces are provided with small extensions 17 of a material which has a very high permeability at low flux densities but which saturates, due to the small cross-section of the projections, under normal load flux conditions. The result of this arrangement is to increase the resultant permeability of the core at low flux densities where the light load droop ordinarily exists. At normal loads the extensions 17 become saturated and do not influence the operation of the meter. For these extensions I have found that the nickel-iron alloy known commercially as permalloy described in United States Patent No. 1,586,688 to Elmen is satisfactory. This material contains approximately 78½% nickel and the remainder iron with a small amount of impurities. This material has a permeability characteristic corresponding in general to curve P, Fig. 5. It has a very high permeability at low flux densities and it starts to saturate at densities which are low relative to the saturation point of silicon steel. The projections 17 should be quite small in cross-section in comparison with the main portion of the core 13 and the parts so proportioned that the change in permeability of the permalloy functions in a suitable manner to correct the overall flux-current curve of the magnetic circuit.

I have also found that the material permalloy may be included in the core as represented in Fig. 3 to approximate the results desired. However, since permalloy has a somewhat higher permeability than the copper-nickel-iron alloy specified it is unnecessary to use so much of the permalloy.

In Fig. 6 I have represented a current transformer 18 of the type employed at 18 in Fig. 1 to which my invention has been applied. 19 represents the primary winding and 20 the secondary winding. The core is made of overlapping laminations 21 and 22 of ordinary silicon steel and a high permeability material respectively. The high permeability alloy has the characteristics corresponding to curve N, Fig. 5. The two kinds of laminations may be stacked with overlapping joints to provide a core with the two kinds of material connected in series in the magnetic circuit. The core of the transformer will then have a resultant permeability which corresponds in general to the dotted line R which is much more nearly constant over a wide range of flux density than either silicon steel or the alloy alone. If then we design the transformer so as to operate over that portion of the flux density range lying between about points X and Y on curve R, we will have a current transformer in which the exciting current will be substantially directly proportional to the load or secondary burden. The ratio and phase angle errors will not only be smaller than in a current transformer having the ordinary silicon steel core but these errors will remain substantially constant over the entire range of operation, which is a very great advantage because the same correction applies at all loads. Such a transformer may be operated with accuracy over a greater range of flux densities than is usual and will result in a material saving in size and weight. When such a transformer is used as at 18 in Fig. 1 with the improvement in the watt-meter herein described an exceptionally high accuracy metering outfit results.

The shape of the curves represented in Fig. 5 may be made to vary somewhat with different heat treatments of the alloys specified. Materials other than those specified may be employed. The copper-nickel-iron alloys described in United States Patents Nos. 1,552,769, 1,582,353 and 1,622,008 to Smith and Garnett are examples of other magnetic materials which may be employed to advantage in accordance with my invention. The number and kinds of materials to be combined and the relative amounts of the materials to be used in any given case will depend upon the permeability characteristic which is desired. In this way the desirable high permeability characteristics of many different materials may be taken advantage of at the different flux densities where these characteristics occur, to obtain a core having a high and more nearly constant permeability over a wide flux density range.

The magnetic materials employed in the present invention are those which have permeability characteristics which are substantially unaffected by ordinary changes in temperature. Such materials should not be confused with those having an appreciable temperature coefficient of permeability which have sometimes been employed in or associated with the magnetic circuits of meter devices to correct for temperature errors.

In accordance with the provisions of the patent statutes, I have described the principle of operation of my invention together with examples of its application in apparatus which I now consider to represent the best embodiment thereof; but I desire to have it understood that the examples given and the apparatus shown and described is only illustrative and that the invention may be carried out by other means.

What I claim as new and desire to secure by Letters Patent of the United States, is:—

1. A magnetic circuit for electromagnetic devices having a single flux path including at least two magnetic materials having a substantially constant temperature coefficient of permeability, one of said materials having a relatively high permeability at a low flux density below saturation and having a low saturation point, and another of said materials having a relatively low permeability at said low flux density, and having a higher saturation point than the first mentioned material.

2. A magnetic circuit for electromagnetic devices having a single flux path including at least two magnetic materials having a substantially constant temperature coefficient of permeability, said materials having different permeabilities at a low flux density below saturation, the material having the higher permeability below saturation having the lower saturation point.

3. A magnetic circuit for electromagnetic devices having a single flux path comprising a high permeability material having a low saturation value and a relatively lower permeability material having a relatively higher saturation value said materials having a substantially constant temperature coefficient of permeability.

4. A magnetic circuit for electromagnetic devices having a single flux path made up of silicon steel and another magnetic material said material having a substantially constant temperature coefficient of permeability and having a higher permeability but a lower saturation point than silicon steel.

5. A magnetic circuit for electromagnetic devices comprising two magnetic materials having a substantially constant temperature coefficient of permeability and having different permeabilities below saturation and different saturation points, the material having the higher permeability having the lower saturation point, the relative proportions of said materials being selected to obtain a magnetic circuit having a resultant permeability which is more nearly constant over a wide range of flux density than that of either of said materials alone.

6. An electromagnetic device having a magnetic circuit made up partially of silicon steel and partially of another magnetic material said material having a substantially constant temperature coefficient of permeability and having a higher permeability than silicon steel at low flux densities, said circuit having a resultant ratio of permeability to flux density below saturation which is more nearly constant than that of silicon steel alone.

7. An electromagnet for a metering device having a core made up partially of silicon steel and partially of a magnetic material said material having a substantially constant temperature coefficient of permeability and having a higher permeability than silicon steel at low flux densities.

8. An induction wattmeter element having a magnetic core member made up partially of silicon steel and partially of a magnetic material having a higher permeability and a lower saturation point than silicon steel.

9. An induction wattmeter having a current core made up partially of silicon steel and partially of a magnetic material having a higher permeability and a lower saturation point than silicon steel, said parts being connected in parallel relation in said current core.

10. An induction wattmeter having a current core composed of laminations of different magnetic materials, said materials having characteristics which give a resultant ratio of permeability to flux density for the core which is more nearly constant over a wide range of flux density below saturation than that of silicon steel.

11. An induction wattmeter having a current core made up of laminations approximately two-thirds of which are of silicon steel and the remainder of a copper-nickel-iron alloy having a lower saturation point but a higher permeability at low flux densities than silicon steel.

12. An induction wattmeter having a current core made up of laminations approximately two-thirds of which are of silicon steel and the remainder of an alloy comprising approximately 76% nickel, 8% copper and 14% iron, the alloy laminations being symmetrically placed between the silicon steel laminations.

13. In combination an electric meter having a current electromagnet excited through a current transformer, the current transformer and current electromagnet having cores made up of magnetic materials having different magnetic characteristics which give a resultant ratio of permeability to flux density which is more nearly constant over the range of flux densities for which they are intended to operate than that of silicon steel.

14. A rotating induction electricity meter, including a torque producing magnet system having current and pressure windings, the current winding having a magnetizable core element surrounded by the current winding and inclusive of two portions included in parallel in the magnetic circuit of this core element, one formed of iron having high permeability relatively to that of the other core portion at the higher flux densities of the current core, and the other portion of nickel steel having higher permeability relatively to that of the first core portion at the lower flux densities of the current core, a closed metallic conductor upon the rotating element of the meter, and a damping magnet whose flux threads such conductor; wherein the core of the current winding is formed with a plurality of limbs, one of these limbs being surrounded by the current winding and wherein the two portions of differing permeability enter into the formation of this core limb.

15. A rotating induction electricity meter, including a torque producing magnet system having current and pressure windings, the current winding having a magnetizable core element surrounded by the current winding and inclusive of two portions included in parallel in the magnetic circuit of this core element, one of these portions having high permeability relatively to that of the other core portion at the higher flux densities of the current core, a closed metallic conductor upon the rotating element of the meter and a damping magnet whose flux threads such conductor.

16. A rotating induction electricity meter including a torque producing magnet system having current and pressure windings, the current winding having a magnetizable core element surrounded by the current winding and inclusive of two core portions in parallel that are surrounded by the current winding and whose permeability differs through a substantial range of flux density in the current core, a closed metallic conductor upon the rotating element of the meter and a damping magnet whose flux threads such conductor.

17. An induction meter including in combination a meter disc and driving means therefor including voltage and current coils and a laminated core in which at least a portion of the laminæ are formed of a material having a high initial permeability.

18. An induction meter including in combination a meter disc and driving means therefor including voltage and current coils and a core formed in part of material having a relatively low initial permeability and in part of a material having a relatively high initial permeability.

19. An induction meter including in combination a meter disc and driving means therefor including voltage and current coils and a core formed in part of material having a relatively low initial permeability and in part of a nickel iron alloy having a relatively high initial permeability.

20. An electrical motor having rotor and stator members, one of which is formed of a core comprising two different magnetic materials, one of said materials having magnetization characteristics similar to ordinary iron and the other being a nickel iron alloy having high magnetization for small magnetizing currents.

21. An electrical motor having relatively rotatable members, one of which consists of a magnetic core provided with windings, said core being divided into two sections, one section being formed of a magnetic material having relatively high magnetization for small magnetizing currents, and the other section being formed of a magnetic material having relatively lower magnetization for like magnetizing currents but capable of substantially greater flux density than the first material for substantially greater magnetizing currents.

22. An electrical motor having relatively rotatable members, one of which consists of a magnetic core provided with windings, said core being divided into two sections, one section being of ordinary iron, and the other being a nickel iron alloy.

23. An electrodynamic device having relatively movable members, one of which consists of a magnetic core provided with windings, said core being divided into a plurality of sections, one section being formed of a magnetic material having relatively high magnetization for small magnetizing currents, and the other section being formed of a magnetic material having relatively lower magnetization for like magnetizing currents but capable of substantially greater flux density than the first material for substantially greater magnetizing currents.

24. A rotating induction electricity meter including a torque producing magnet system having current and pressure windings, the current winding having a magnetizable core element formed of two core portions in parallel which are coextensive throughout the length of the core and whose permeabilities differ through a substantial range of flux density in the current core.

25. A rotating induction electricity meter including a torque producing magnet system having current and pressure windings, one of these windings having a magnetizable core formed of two portions in parallel which are coextensive throughout the length of the core, said portions having differing permeability curves throughout a substantial range of flux density.

26. A rotating induction electricity meter, including a torque producing magnet system having current and pressure windings, there being a magnetizable core in the path of the flux due to the current winding and inclusive of two portions included in parallel in the magnetic circuit of this core element, one formed of iron having high permeability relatively to that of the other core portion at the higher flux densities of said core, and the other portion of nickel steel having higher permeability relatively to that of the first core portion at the lower flux densities of said core, each of these materials having a negligible temperature coefficient of permeability, a closed metallic conductor upon the rotating element of the meter, and a damping magnet whose flux threads such conductor.

27. A rotating induction electricity meter, including a torque producing magnet system having current and pressure windings, there being a magnetizable core in the path of the flux due to the current winding and inclusive of two portions included in parallel in the magnetic circuit of this core element, one formed of iron having high permeability relatively to that of the other core portion at the higher flux densities of said core, and the other portion of nickel steel having higher permeability relatively to that of the first core portion at the lower flux densities of said core, each of these materials having a negligible temperature coefficient of permeability, a closed metallic conductor upon the rotating element of the meter, and a damping magnet whose flux threads such conductor and wherein said core is formed with a plurality of limbs, one of these limbs being surrounded by the current winding and wherein the two portions of differing permeability enter into the formation of this core limb.

28. A rotating induction electricity meter including a torque producing magnet system having current and pressure windings, a magnetizable core threaded by the flux due to the current winding and consisting of a plurality of sets of similarly shaped laminæ, the laminæ of each such set having relatively differing permeability flux characteristics giving a substantially constant flux permeability relation in said core at both light and heavy loads.

ISAAC F. KINNARD.